Feb. 13, 1940.  F. E. STAHL  2,190,130
METHOD OF MAKING TWISTED CHAIN
Filed Sept. 27, 1938  7 Sheets-Sheet 1

Inventor.
FRANK E. STAHL
by J. W. M. Ellis
Attorney

Feb. 13, 1940. F. E. STAHL 2,190,130
METHOD OF MAKING TWISTED CHAIN
Filed Sept. 27, 1938 7 Sheets-Sheet 2

Inventor
FRANK E. STAHL
by J. W. Ellis
Attorney

Inventor,
FRANK E. STAHL
by J. Wm. Ellis
Attorney

Feb. 13, 1940.   F. E. STAHL   2,190,130
METHOD OF MAKING TWISTED CHAIN
Filed Sept. 27, 1938   7 Sheets-Sheet 5

Inventor,
FRANK E. STAHL
by J. Wm. Ellis
Attorney

Feb. 13, 1940.   F. E. STAHL   2,190,130
METHOD OF MAKING TWISTED CHAIN
Filed Sept. 27, 1938   7 Sheets-Sheet 7

Inventor,
FRANK E. STAHL
by J. W. Ellis
Attorney

Patented Feb. 13, 1940

2,190,130

UNITED STATES PATENT OFFICE 2,190,130

METHOD OF MAKING TWISTED CHAIN

Frank E. Stahl, Tonawanda, N. Y.; Lillie M. Stahl, administratrix of the estate of said Stahl, deceased, assignor to Columbus McKinnon Chain Corporation, Tonawanda, N. Y., a corporation of New York Application September 27, 1938, Serial No. 231,958

12 Claims. (Cl. 59—35)

My invention relates in general to twisted chain and particularly that type of chain which, when cut into suitable lengths, is used for the cross-chains of anti-skid devices for use upon vehicle tires.

My invention has to do particularly with the formation of twisted chain having links each formed from wire having an irregular cross-section, as for instance, the wire shown and described in my Patent No. 1,786,318 issued to me on December 23, 1930. The wire shown in this patent and from which the links of the patent, and those of the present application are formed, has one side substantially cylindrical in cross-sectional form and its opposite side substantially wedge-shape in form and relatively sharp at the extreme edge, which edge extends longitudinally of the wire and preferably parallel to the axis thereof.

Wire of this cross-section, when formed into links, is so arranged previous to being formed that its sharp edge is located at that side of the link which is presented to the pavement, whereby added traction is afforded by reason of the sharp, projecting edges which engage with the road surface or ice thereon. The opposite round side of the link is in engagement with the tire, whereby wearing and abrading thereof will be avoided.

It is obvious, in the manufacture of such twisted chain, that the links must be properly assembled when being made from the blanks so that when later twisted all of the sharp traction edges will being located at one side of the chain, and consequently, all of the round surfaces at the other side thereof.

It is, furthermore, desirable that the joints in the links before welding and twisting be so arranged with respect to each other that the chain may be conveniently run through any well-known type of welding machine.

The principal object of my invention has been, therefore, to so assemble the chain links when being formed that, after subsequent welding and when twisted, the sharp traction edges of all links will be at one side of the chain.

Another object has been to so assemble the links when being formed that the joints will be arranged in such manner that they may be conveniently welded.

As hereinbefore pointed out, it is essential that the links of the chain, before being twisted, be so arranged when assembled and formed with respect to the cross-section of the wire forming the same that when subsequently welded and twisted, the same side of the cross-section of the wire will be on the same side of the finished, twisted chain. This may be accomplished in a number of ways, it being essential, however, that similar faces of adjacent links be successively arranged at substantially right angles to each other and in helical formation, each successive link being rotated in the same direction as the preceding one. Furthermore, when the links are subsequently welded and twisted, the direction of rotation of the twisting mechanism which twists the chain bears a definite relation to the direction of the rotative arrangement of the links before twisting.

In the accompanying drawings I have shown one way of assembling and twisting the links of the chain and one form of apparatus whereby the method may be carried out, it being obvious, as hereinbefore pointed out, that other ways of assembling and twisting may be used and that other forms of apparatus may be employed for carrying out my method. In the drawings.

Referring now to the drawings, and particularly to Figs. 1 to 13, inclusive, I show the step-by-step formation of the links. The cross-section of the wire of which the links of my chain are formed is shown at the end of the blank 30 of Fig. 1 and also in Fig. 3. This cross-section is of general elliptical form, being round at one side 31 and tapered to a relatively sharp traction edge 32 at the opposite side thereof. This blank, which is severed in the chain forming machine, hereinafter described, is passed through such machine and is formed in well-known manner into the link 33, shown in perspective in Fig. 2.

In the formation of the chain, as hereinafter described, it is necessary that the links be rotated and turned upon various axes at various times, and, for clearness of illustration and description, I have indicated on Fig. 2 and also upon some of the other figures a major axis 34 indicated by the line 35—36 which extends across the link longitudinally of its length and midway of its width. A minor axis 40 extends laterally of the link midway its length and is indicated by the line 41—42. Some of the links in one step of their formation are turned end-for-end and are rotated on substantially what will be termed a perpendicular axis 43. This axis extends through the center of the link midway its length and width and perpendicularly to a plane passing through the major and minor axes. This perpendicular axis is represented by the line 44—45 of Fig. 2.

Figures 1, 2:
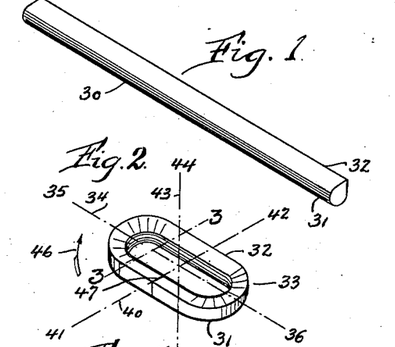
In Figs. 1 and 2 and 5 to 13, inclusive, I show perspective views of various steps in the formation and assembling of the links by the preferred manner hereinafter described.

It will be obvious that each link, as shown in Fig. 2, is formed from the blank 30, shown in Fig. 1, on a chain forming machine and by means of a mandrel forming part of the apparatus for carrying out my invention and hereinafter described. The rod from which the blanks 30 are formed is fed in such position that when the blanks are successively formed into links, as illustrated by the step shown in Fig. 2, the sharp traction edge 32 will be arranged around the outer periphery of the link, as shown in this figure, as well as in the other figures, and particularly as shown in the cross-sectional view of Fig. 3. When arranged in this position and subsequently twisted, portions of the sharp traction edges of each link will be arranged at one side of the chain and presented to the pavement for gripping traction. Since, in the formation of the chain, the joints in the links occupy positions about the major axes of the links which are at 90° from each other I have, for clearness of description, indicated these positions diagrammatically in Fig. 4. In this figure, the positions just referred to are indicated by points 1, 2, 3, and 4, arranged about the major axis 34 of the link, at 90° from each other, and in a plane perpendicular to such major axis which is shown as passing through the point of intersection of lines extending from points 1—3 and points 2—4. After the formation of the link 33, shown in Fig. 2 (which is the first link to be formed in the chain), is completed with the joint 47 in front of the major axis of the link, and before another blank is fed to the machine, turning fingers, well known in chain forming machines of the present day and as hereinafter illustrated and described, grasp this first link 33 and rotate it, upon its axis 40, preferably in clockwise direction, as viewed in the drawing and as indicated by the full-line arrow 46 through an angle of 90° and to the position shown in Fig. 5. When the first link has been moved from the position shown in Fig. 2 to the position shown in Fig. 5, its major axis 34 will occupy a vertical position and the joint 47 thereof will be disposed at point 1 of Fig. 4. While being held by the turning fingers in the position shown in Fig. 5, a second blank 50 is fed through the first link 33 and immediately formed into the second link 51 shown in Fig. 6. Previous to this stage of formation of the second link, the turning fingers have released the first link 33 and have now grasped the second link 51.

Figures 3, 4, 5, 6, 7, 9, 10:
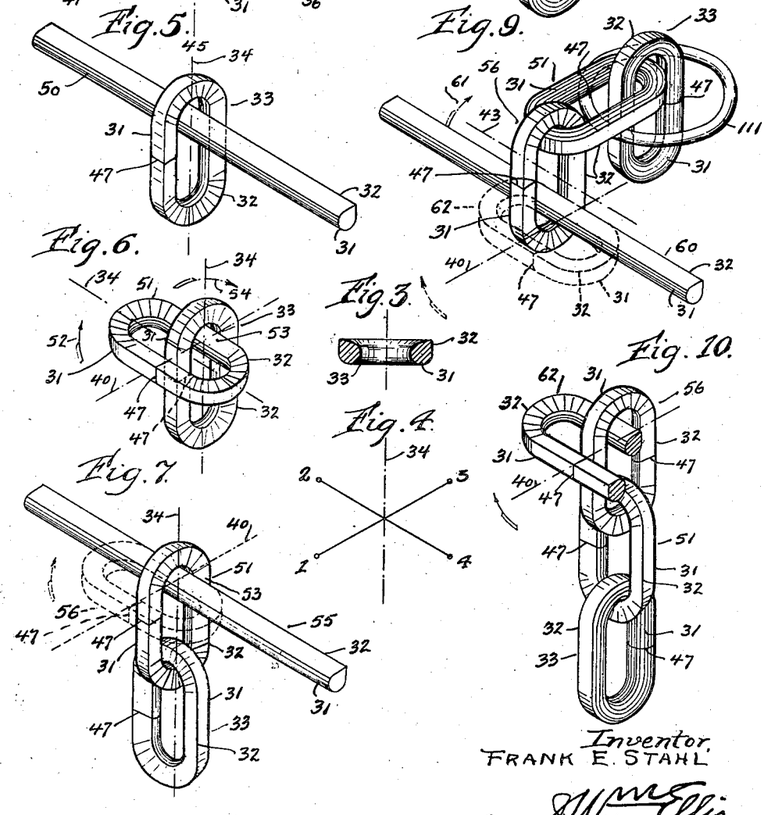
Fig. 3 is a cross-sectional view of one of the links and is taken on line 3—3 of Fig. 2.
Fig. 4 is a diagrammatic view showing points indicating various positions which the joints in the links of my chain occupy during formation of the chain.

As hereinbefore pointed out, it is necessary, in order that the faces of successive blanks be properly arranged, that each successive link have similar faces arranged at substantially right angles to each other and in rotative or helical manner throughout the length of the chain. The second link 51, therefore, is also rotated in clockwise direction, as indicated by the arrow 52. This second link is, like the first link, rotated on its minor axis 40 through substantially 90° and to such a position that its major axis 34 will be vertically arranged, as shown in Fig. 7. When rotating the second link 51 from the horizontal position in which it is formed, and as shown in Fig. 6, to the vertical position, as shown in Fig. 7, the first link 33, which normally rests upon the side 53 of the link (which is opposite the joint 47), will slide to the right-hand end of the link 51 on its side 53, as this link is rotated on its minor axis 40, until it reaches the lower end of the link from which it is suspended. In sliding down the side 53 and around the end of the second link 51, the first link 33 is rotated upon its major axis through substantially 90° in a clockwise direction, as indicated by the dot-and-dash arrow 54. It will be noted that the wire is so formed that each link, as it is formed, has its sharp traction edge 32 arranged uppermost. Furthermore, each link as it is rotated clockwise on its minor axis 40 from the horizontal position of Fig. 2 to the vertical position of Fig. 5, as hereinbefore described in connection with the illustrative method, will have its sharp traction edge 32 foremost and its round surface 33 at the side away from the observer. Moreover, when the second link 51, and each successive link thereafter, is rotated on its minor axis 40 from its horizontal position, shown in Fig. 6, to the vertical position, shown in Fig. 7, the next preceding link, when rotated on its major axis 34 in clockwise direction, will have its side bearing the sharp traction edge 32 rotated, as just above indicated, through an angle of substantially 90°. Since each successive link is thus rotated during the movement just above described, each such successive link will have its sharp traction face at 90° to the similar face of the next preceding link and also to that of the next succeeding link; and, since the rotation of each of the links on its minor axis from its horizontal position to its vertical position is in the same direction (clockwise in the present instance), such traction faces will be in helical arrangement throughout the length of the chain, as clearly shown by many of the figures of the drawings and particularly by Figs. 12 and 13.

As clearly shown in Fig. 7, the first link 33 when being moved from the position of Fig. 6 to the position of Fig. 7, during the time it is rotated upon its major axis 34 in the direction indicated by the arrow 54, the joint thereof will be moved from the position of point 1, indicated diagrammatically in Fig. 4 (which it occupies in Fig. 5), to the position of point 2, and the second link 57, by being rotated upon its minor axis 40 from the position of Fig. 6 to the position of Fig. 7, will have its joint 47 arranged in the position of point 1.

After the second link 51 has reached its vertical position, as shown in Fig. 7, with the first link 33 suspended from the bottom thereof, a third blank 55 will be fed through the second link 51 and above the first link 33, as clearly shown in Fig. 7. This third blank will then be formed into the third link 56, shown in dotted lines in Fig. 7, in the manner above described in connection with the formation of the first and second links. After the third link is formed, it is rotated on its minor axis 40 from the dotted line horizontal position of Fig. 7 to the vertical position shown in Fig. 8.

Figure 8:
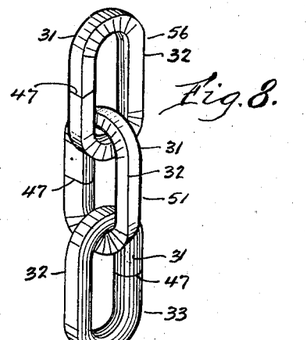

In the movement of the third link 56 shown in dotted lines in Fig. 7 to the position of Fig. 8, the first and second links 33 and 51, respectively, will be rotated on their major axes 34 through another 90° which will bring the joint 47 of the first link 33 to position indicated by point 3 and will also bring the joint 47 of the second link 51 to the position indicated by point 2 (see Fig. 4). From Fig. 8, it will, however, be seen that the joint of the third link 56 is arranged in position 1, or in a position which is diametrically opposite to the position occupied by the joint of the first link 33 at point 3. In order to bring the joint 47 of the link 56 around to the same side as that occupied by the joint of the first link, or point 3, it is necessary to move the second link 51 to the upper end of the third link 56 and to feed the blank 60 of the fourth link into the third link 56 below the second link 51. This is accomplished by lifting the first and second links during the feeding of the blank which is to form the fourth link and, in such lifting, the first and second links are moved to the positions shown in Fig. 9. In order to move the first and second links to this position, a lifter ring 111 is employed. This ring forms a part of the illustrative apparatus hereinafter described and is so designed that it will be operated to lift the chain previously made during the formation of each two successive links, for reasons hereinafter pointed out. During the time the first and second links 33 and 51 are lifted, as shown in Fig. 9, the blank 60 for the fourth link is fed into the third link and under the second link 51, as just above described, whereupon the fourth link 62, shown in dotted lines in Fig. 9, is formed. After the formation of the fourth link 62, and before it is rotated upon its minor axis 40 from the position shown in Figs. 9 and 10 to the position shown in Fig. 11, the lifter ring drops the links 33, 51, and 56 of the chain previously formed, whereby the third link 56 is rotated upon its perpendicular axis 43, as indicated by the dot-and-dash arrow 61, and is thereby turned end-for-end to the position occupied in Fig. 10. In such turning movement, the joint 47 thereof will be moved from the position shown in Fig. 8, where it is diametrically opposite to the joint of the first link 33, to a position where it will be on the same side as the joint of the first link or in the position indicated by point 3.

Figure 11:
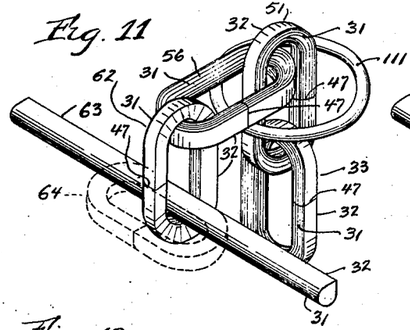

After the first, second, and third links have assumed the positions shown in Fig. 10 by the return of the lifter ring to its inactive position, the fourth link 62 will, after its formation, be rotated upon its minor axis 40, as shown in Fig. 11, which will turn each of the first, second, and third links on their major axes 34 through an angle of 90°. This will bring these links to such positions that the joint of the first link 33 will occupy a position indicated by point 4; the joint of the second link 51 will be brought to the position indicated by point 3; and the joint of the third link 53 will be brought to the position indicated by point 4 or in the same position as that of the joint of the first link (see Fig. 4). The positions of joints just indicated are clearly shown by the respective links of Fig. 12.

As hereinbefore indicated, it is necessary, in order to bring the joints of alternate links on the same side of the chain and the sharp traction faces of successive links in rotated or helical arrangement, that the blanks for each alternate pair of successive links be fed under the previously formed link.

Figure 12:
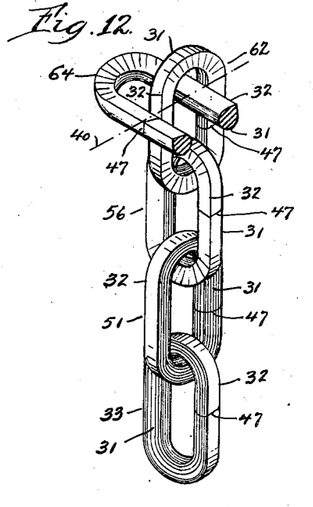

Since the joint of the fourth link, after being rotated upon its minor axis 40 through 90° to the position shown in Fig. 11, is on the side opposite the joint of the second link 51 (before the other links are lifted, as shown), it is necessary to turn this link end-for-end on its perpendicular axis 43 in a manner similar to the previous or third link 56. This will bring the joint of this fourth link 62 on the same side as the joint of the second link 51, or at point 3 (Fig. 4), as shown in Fig. 12. In order to accomplish this turning, it is necessary that the first, second, and third links be lifted by means of the lifter ring 111 (see Fig. 11), so that the blank 63 for the fifth link may be fed through the fourth link 62 and underneath the third link 56. The blank 63 is then formed into the fifth link 64, as shown by the dotted lines in Fig. 11. After this fifth link is formed, the lifter ring is lowered, thus allowing the first four links to be suspended from the horizontally arranged side of the fifth link 64, as shown in Fig. 12, whereupon the joint 47 of the fourth link 62 will be moved from the position shown in Fig. 11 to the position shown in Fig. 12, as just above pointed out. As indicated in Fig. 12, the joints 47 of the first and third links 33 and 56, respectively, are upon the same side of the chain, or at point 4, and the joints of each successive odd link will lie in the same plane. Likewise, the joints of the second and fourth links and each successive even link will lie in another plane which is at right angles to the plane of the odd links.

Figure 13:
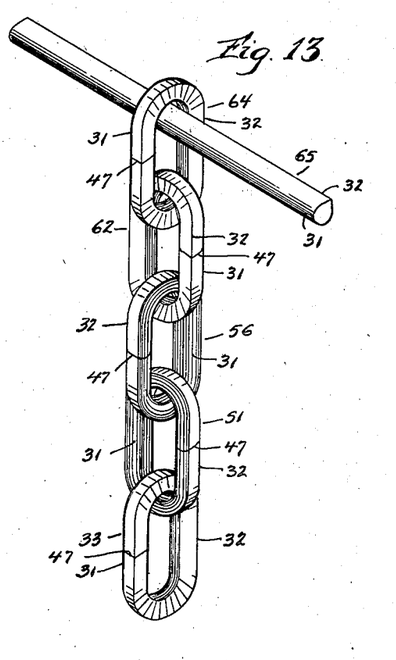

After the first four links have been allowed to assume the positions shown in Fig. 12, they will be suspended from one of the horizontally disposed sides of the fifth link 64 and, at this point, this fifth link is rotated upon its minor axis 40 (in a manner similar to the first link 33) until it occupies the position shown in Fig. 13. During this movement, the first four links will be rotated through 90°, or to the positions shown in Fig. 13, and the joints will thereby be moved from the positions of Fig. 12 to those of Fig. 13. In such positions it will be seen that the joints of the first four links still occupy the same relative positions as above described, and it will also be obvious that the joint of the fifth link will occupy a position occupied by the joints of the first and third links. The blank 65 for the sixth link will, therefore, be fed into the fifth link 64 above the fourth link 62, as clearly shown in Fig. 13, and in the same manner as the feeding of the second blank 50 through the first link 33.

The blank 65 is formed into the sixth link in a manner similar to the formation of the second link 51, and the next blank for the seventh link is fed and formed similarly to the feeding and forming of the blank 55 for the third link. The sixth and seventh blanks and links are treated similarly to the second and third blanks and links, hereinbefore described. The seventh link, however, when formed, will occupy the same position as the third link 56, shown in Fig. 8, and it is then necessary, in order to bring the joint of this seventh and the next successive or eighth link on the proper side of the chain, to feed the blank for the eighth link through the seventh link and under the sixth link and, likewise, the blank for the ninth link through the eighth link and under the seventh link, in a manner similar to the formation of the fourth and fifth links shown clearly by Figs. 9 to 12, inclusive, whereupon the next two successive blanks will be fed on top of the preceding links during the next cycle, as shown in a manner similar to the feeding of the blanks for the second and third links and the blanks for the sixth and seventh links. This successive and alternate feeding of pairs of blanks will continue in the same manner throughout the entire chain.

As hereinbefore pointed out, it is necessary in order that the finished twisted chain have all of the sharp traction faces on one side of the chain and all of the round faces on the other side thereof, that each successive link, before twisting, be turned through 90°. This is clearly shown by Fig. 13 where it will be seen, starting with the first link 33 and moving upwardly through the next succeeding links, that each successive link has its sharp traction face 32 arranged at right angles to the next preceding link. In other words, the sharp traction face 32 of link 33 faces point 4. Each succeeding link 51, 56, 62, and 64 has its sharp traction face 32, respectively, facing points 3, 2, 1, and 4.

After the chain has been formed according to my method and as above described, it is twisted by having a section thereof placed within the head stock of a lathe (hereinafter shown and described), or other turning device, while one end is being held rigidly or stationarily in the tail stock of the machine. The head stock spindle is then rotated and the length of chain between the head stock and the tail stock is thereby twisted. The twisting is continued until each link being twisted has its ends arranged at an angle of substantially 90° to each other, as clearly shown in Figs. 14 and 15. Since the sharp traction faces of each of the successive links have been arranged rotatively about the axis of the chain and at substantially 90° to each other, it will be clear that during such twisting, each link will be brought around rotatively, throughout the entire length of the treated section of the chain, whereby the traction faces of all of the links in said section will be brought to one side of the finished twisted chain, as clearly indicated in Fig. 14.

I have discovered that the direction of rotation of the head stock spindle of the twisting machine, when twisting the chain, has a definite bearing upon the direction of rotation of the links on their minor axes when being formed and, consequently, the direction of the helix formed in the chain by the traction surfaces. For instance, when the links have been rotated, as indicated by the illustrative form of chain, on their minor axes in clockwise direction, the helix will be clockwise and then the chain will be twisted in clockwise direction when viewed from either end toward the other. If, in the formation of the chain, the links have each been rotated on their minor axes in a counterclockwise direction, the helix will be in counterclockwise and then the twisting will be in counterclockwise direction. As hereinbefore clearly pointed out, it is necessary that all of the sharp traction faces of the links of chain made by my method be on the same side of the chain after the links thereof are twisted. While I have shown these results accomplished by feeding two successive link blanks above the previously formed links and, alternately, feeding two successive link blanks below the previously formed links, the chain may be formed in a number of other ways. For instance, the blanks may be fed alternately one above and one below the previously formed link, each successive link rotated either uniformly clockwise or counterclockwise. In the event that the links are rotated on their minor axes in a clockwise direction, then the chain will be twisted in clockwise direction, as viewed from one end of the chain toward the other. If the chain is formed as just above indicated and the links are rotated on their minor axes in counterclockwise direction, then the chain will be twisted also in counterclockwise direction. Furthermore, my method may be carried out by feeding all of the blanks above the previously formed links. If in such modified method the successive links are rotated on their minor axes in clockwise direction, then the chain is twisted clockwise, as viewed from one end toward the other; whereas, if such links in their formation are twisted on their minor axes in counterclockwise direction, then the chain will be twisted in counterclockwise direction. Of course, as hereinbefore pointed out, it is desirable to have the joints of alternate links arranged in the same plane and the joints of the intermediate alternate links all arranged in the same plane but different from the first plane, such plane of the intermediate links being preferably at right angles to the plane of the first mentioned joints, for convenience in welding the links in a standard welding machine. However, if such joints are arranged successively at positions at 90° to the preceding link in the same direction of rotation or in helical manner, as they will be when made in accordance with the last four modified methods just above mentioned, the welding of the joints may be accomplished in any other desired way.

As hereinbefore pointed out it is necessary, in the manufacture of twisted chain having links formed from stock of irregular cross-section, that the links be properly assembled as they are being formed from the wire blanks in order that similar surfaces of each link will be on the same side of the chain when finally completed. Any suitable apparatus may be employed, as hereinbefore pointed out, for carrying out the steps of my method and, for illustrative purposes, I have shown one form of such apparatus. The apparatus shown in Figs. 16 to 26, inclusive, shows a link forming machine which is more or less of standard form except for specific features designed especially for carrying out my method.

This apparatus comprises a bed 70 supported by suitable pedestals 71. As is customary in link forming machines of this type, a main cam shaft 72 and an auxiliary cam shaft 73 are provided. These cam shafts are preferably connected together by means of a pair of bevel gears 74, so proportioned that the auxiliary cam shaft 73 will be rotated one revolution to each two revolutions of the main cam shaft 72. The bed carries forming slides 75 and 76, each of which carries a standard link forming arm 77, and each of which is operated by suitable cams which do not form part of this application and, therefore, are not further described.

The blank stock 80 is fed to the machine through straightening rollers 81 and by means of a feed arm 82, suitably driven by means of a cam 83, which does not form part of my invention. A gripper 84 is, likewise, provided on machines of this type and is worked in synchronism with the feeding arm 82. As is customary, the blank stock 80 is fed into the machine through a pair of well known cut-off dies, indicated at 78, and against a suitable stop 85, which parts are standard equipment with machines of this type and are, therefore, not further described.

Figure 16:
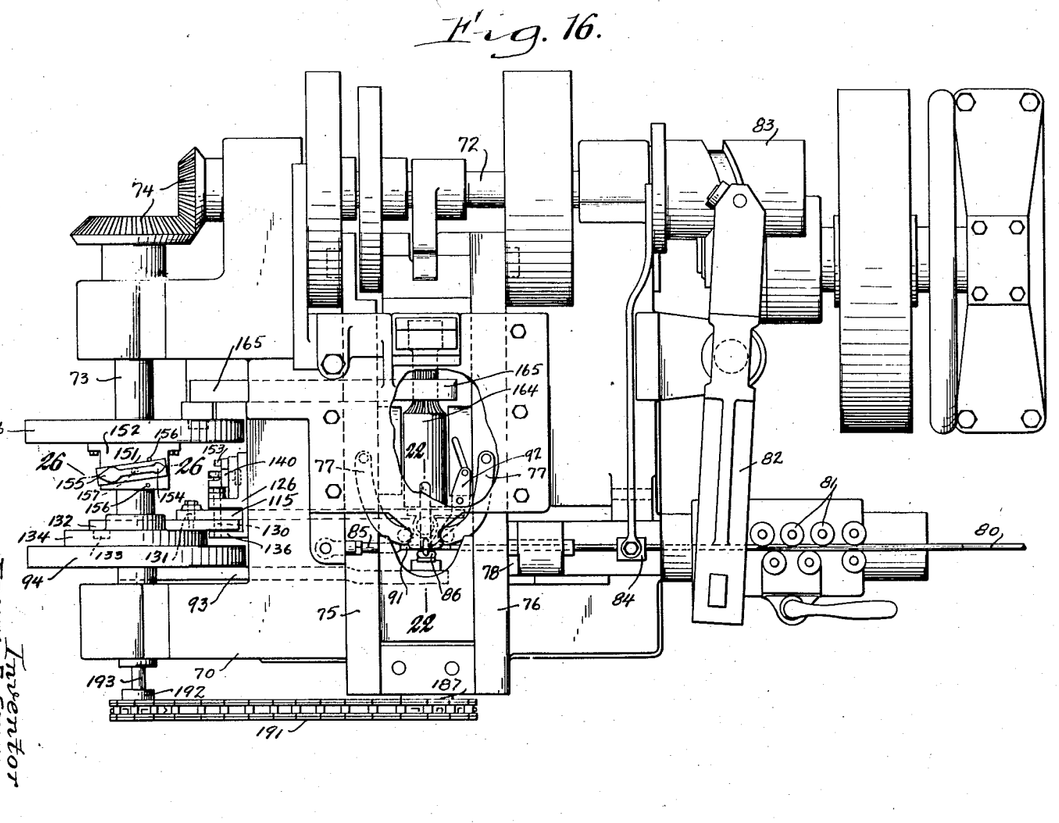
Fig. 16 is a plan view of one form of device for shaping the chain links.
Figures 22, 23, 24:
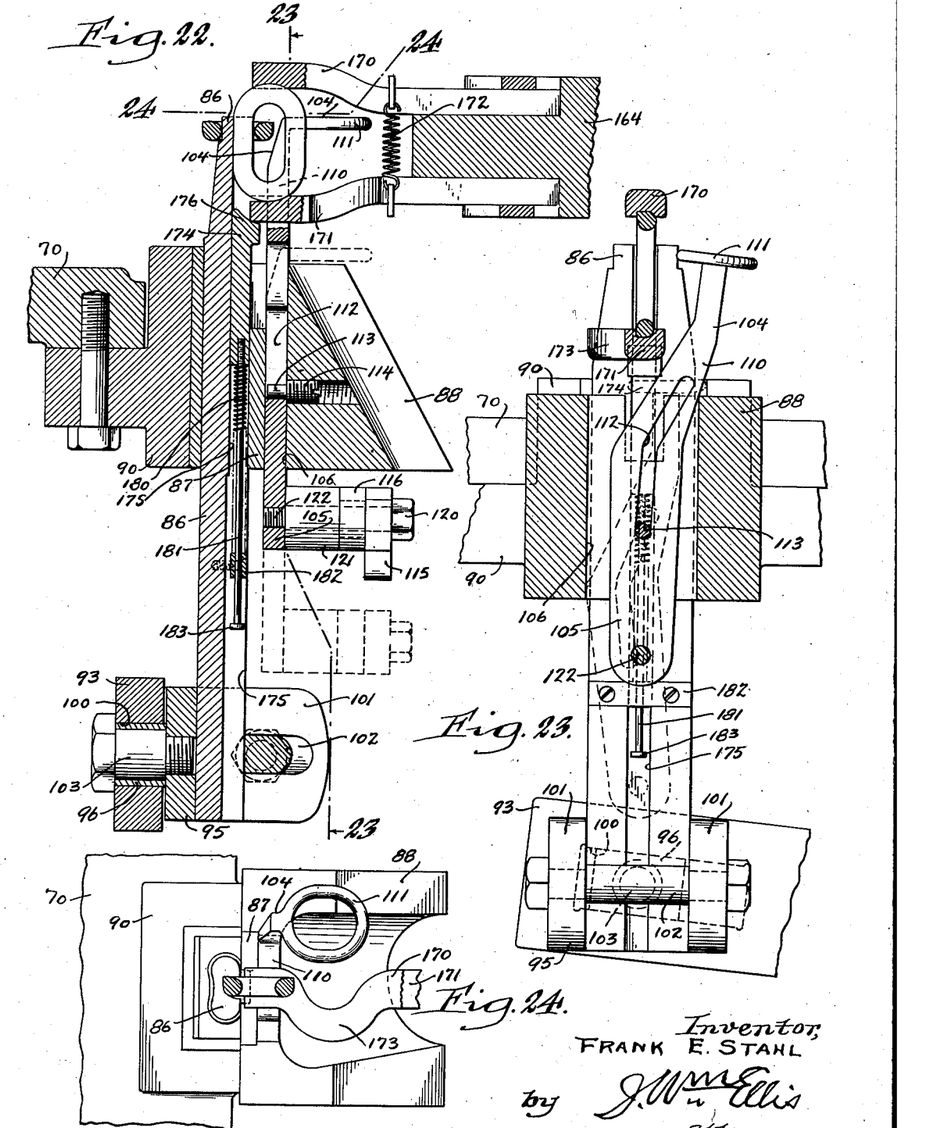
Fig. 22 is an enlarged, fragmentary, sectional elevation taken on line 22—22 of Fig. 16.
Fig. 23 is an enlarged, fragmentary, sectional view and is taken on line 23—23 of Fig. 22.
Fig. 24 is an enlarged, fragmentary, sectional, plan view taken on line 24—24 of Fig. 22.
Figure 25:
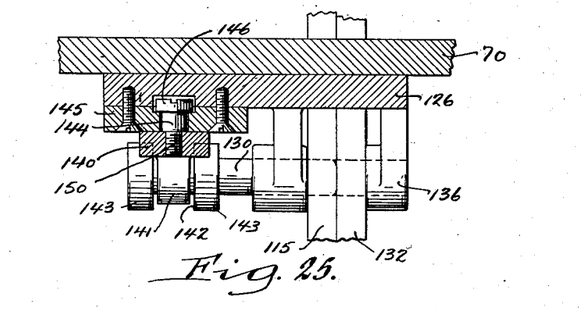
Fig. 25 is an enlarged, fragmentary, sectional view taken on line 25—25 of Fig. 19.
Figure 26:
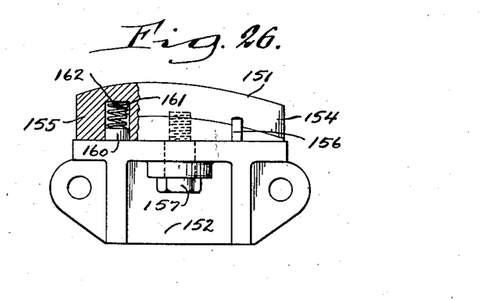
Fig. 26 is an enlarged, fragmentary view taken on line 26—26 of Fig. 16.

Referring now particularly to Figs. 22 to 24, inclusive, the apparatus is provided with a mandrel 86 which is so mounted as to slide vertically in a mandrel bracket 90 carried by the bed 70. The mandrel is held in place within the bracket by means of a retaining plate 87. This retaining plate is preferably held in place by means of a mandrel bracket cap 88 which is suitably secured to the mandrel bracket. The upper end of the mandrel is shaped to fit the link, as is customary, and is brought in position in timed relation with the link forming arms 77 for the formation of the blank into a link. In Fig. 16, a blank 91 is shown in position against the mandrel ready to be operated on by the link forming arms. During the formation of the link, it is obvious that, in machines of this type, some means must be provided for holding the blank against the mandrel prior to the forming thereof into a link. This is accomplished by means of a clamping finger 92. Usually, two such clamping fingers are employed, but in the apparatus shown for illustrative purposes, only one is employed, shown in Fig. 16, for reasons to be hereinafter stated. Obviously, this clamp finger is actuated in timed relation with the movement of the link forming arms, as is customary in this type of machine.

Referring now specifically to Figs. 16, 22, and 23, a mandrel lever 93 is provided which is suitably pivoted to the bed 70 of the machine and is actuated in customary manner by means of a mandrel cam 94. So as to provide for the arcuate movement of the arm of the mandrel lever, a mandrel holder block 95 is pivotally attached to a block 96 which is mounted in a slide 100 formed in the end of the mandrel lever.

The mandrel block is provided with two arms 101, between which the lower end of the mandrel is disposed. A mandrel wedge 102 is disposed across the space between the arms and bears against the mandrel, whereby the mandrel may be securely clamped in place after its vertical adjustment. The mandrel block is attached to the block 96 by means of a mandrel block screw 103.

As hereinbefore pointed out, in my preferred method, the blanks are fed one at a time into the first next preceding links by first successively feeding two link blanks above the two second, next preceding links, and then in alternate manner, successively feeding link blanks into the first next preceding links and below the two second, next preceding links. In order to feed the blanks below each of the two second, next preceding links, it is necessary to provide means for lifting each of these links with the attached preceding links before each succeeding blank is fed into the first, next preceding link. In order to accomplish this, I provide the apparatus with a chain lifter 104. This lifter is formed with a downwardly extending arm 105 which is slidably mounted within a slot 106 formed in the mandrel bracket cap 88. The slot 106 is considerably wider than the width of the arm 105 (see Fig. 23), so that lateral movement of the arm, as well as longitudinal movement, will be permitted. The lifter is also provided with an upwardly extending arm 110, which is set at an angle with the arm 105 and which carries at its upper end a lifter ring 111. The ring 111 is arranged preferably at right angles to the plane of the arms 110 and 105 and is of such a size to permit the chain to freely pass therethrough. In the arms 110 and 105 there is formed an angular slot 112 which engages with a lifter stud 113. This stud is carried by a screw 114 and the stud projects into the space 106 where it engages with the angular slot 112, whereby when the lifter is reciprocated by means hereinafter described, the ring 111 will be moved from the full-line position to the dotted-line position, and vice versa, as clearly shown in Figs. 22 and 23.

Figures 20, 21:
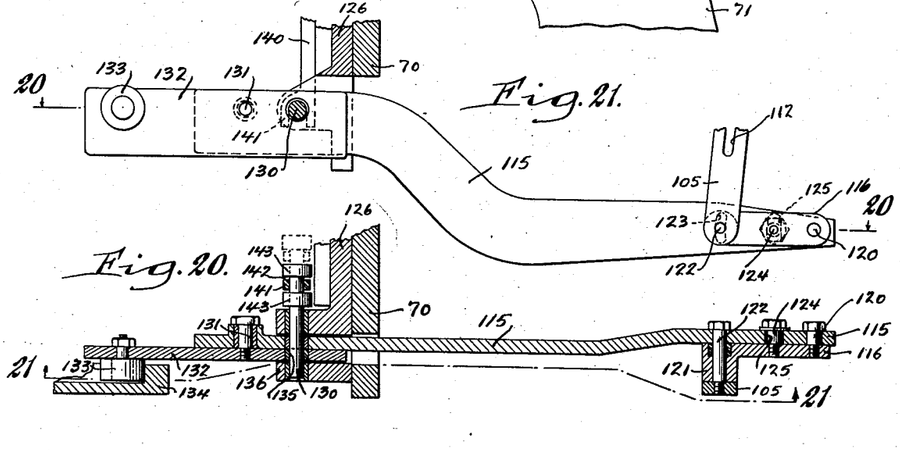
Fig. 20 is a fragmentary, sectional, plan view of a portion of the apparatus and is taken on line 20—20 of Fig. 21.
Fig. 21 is a fragmentary, sectional elevation of the parts shown in Fig. 20 and is taken on line 21—21 of Fig. 20.

The chain lifter 104 is operated by means of a chain lifter lever 115, clearly shown in Figs. 19, 20, 21, and 25, which is suitably pivoted as hereinafter described. Carried at the outer end of this chain lifter lever is a chain lifter arm 116 which provides means for adjusting the relative position of the chain lifter and the lifter lever which actuates it. The lifter arm is attached to the lifter lever in pivotal manner by means of a screw 120. The arm extends inwardly toward the pivotal connection of the lever and is provided at its inward end with a boss 121 to which the lower end of the arm 105 of the chain lifter 104 is pivotally attached by means of a bolt 122 (Figs. 20, 21 and 22). This bolt passes through the boss 121 and through an arcuate slot 123 formed in the end of the lifter lever 115, whereby the inner end of the lifter arm may be moved up and down with respect to the lifter lever in adjusting the ring 111 of the chain lifter to the proper position. A locking screw 124 passes through a slot 125 formed in the lifter lever between the bolts 120 and 122 and into the lifter arm 116, whereby the arm may be rigidly fixed in its adjusted position.

A fulcrum pin bracket 126 is carried by the bed 70 of the machine and provides a sliding support for the fulcrum pin 130 of the chain lifter lever 115 (see Figs. 20 and 21). This fulcrum pin is normally in the dotted-line position shown in Fig. 20 and, when in this position, supports the chain lifter lever 115. At the extreme inner end of the lifter lever is a lever arm pivot bolt 131 upon which is pivotally mounted a lifter lever arm 132. This lever arm carries a cam roller 133 at its outer end and this roller engages with a suitable chain lifter cam 134 (see Figs. 16, 20 and 21), which is preferably made integral with the mandrel cam 94 and designed to give two impulses or movements for each rotation of the auxiliary cam shaft 73. This lifter lever arm is operated about the lever arm pivot bolt 131 without performing any function as to the operation of the chain lifter lever until the fulcrum pin 130 is moved axially into engagement with an aperture 135 when such aperture is brought into registration with the pin. At this point, the pin is moved axially to the full-line position shown in Figs. 20 and 25, at which time the fulcrum of the lifter lever arm 132 is changed from the pivot bolt 131 to the fulcrum pin 130. When so engaged, the actuation of the lever arm 132 will cause the chain lifter lever 115 to be actuated. When the fulcrum pin 130 is moved to engage the lifter arm 132, it changes the pivotal connection of the arm from the pivot bolt 131 to said pin. When the pin 130 is moved beyond the farther face of this arm and into an aperture formed in the arm 136 of the fulcrum pin bracket 126, the extreme outer end of the pin is thereby steadied. The fulcrum pin 130 is moved axially by means of a yoke lever 140 (see Figs. 16, 19, 20, 21 and 25), the lower, bifurcated end 141 of which engages a groove 142 formed by two interspaced collars 143 positioned at the outer end of the fulcrum pin 130. This yoke lever is pivotally carried by means of a pivot bolt 144 (see Fig. 25), which is carried by a fulcrum pin plate 145. The head 146 of the bolt is preferably mounted within a recess formed in the fulcrum pin bracket 126 and the plate is fastened to the bracket by suitable means, such plate forming a bearing for the fulcrum pin 144, the screwthreaded end 150 of which passes into the yoke 140, whereby it is pivotally attached to the fulcrum pin bracket.

As hereinbefore stated, there are two impulses of the lifter lever arm 132 for each revolution of the auxiliary cam shaft 73. Obviously, one impulse corresponds to each blank fed to the machine and formed into a link. For reasons hereinbefore given, two of the impulses will operate the chain lifter lever 115 and the connected lifter 104, whereas the next two successive impulses will idly move the lifter lever arm 132 without actuation of the lever 115. It is necessary, therefore, that the fulcrum pin 130 be actuated every third and fourth impulse given to the lifter lever arm 132. In order to accomplish this, it is necessary to actuate the yoke lever 140 so as to shift the fulcrum pin 130 axially and to keep it in the position where it is engaged with the chain lifter lever, or when it is in the position of non-engagement therewith, during each pair of impulses as above referred to. In order to accomplish this, a trigger finger 151 is provided, clearly shown in Figs. 16 and 26. This finger is pivotally mounted upon a pivot bolt 157 which is carried by a bracket 152, rigidly mounted upon the turning rack cam 166. This trigger is engageable with a lug 153 carried at the upper end of the yoke lever 140. The trigger finger is pivotally attached to the bracket 152 and is formed at its forward end with an arrow-shaped point 154. The rear end of the arrow is formed with a head 155. Stop pins 156 limit the movement of the finger in either direction. A friction plunger 160 is located in an aperture 161 formed from the under side of the trigger finger and a spring 162 serves to keep the plunger pressed in contact with the surface of the bracket, so that the finger will be frictionally held in either of the two extreme positions to which it has been moved. As clearly shown in Figs. 16, 19 and 20, where the fulcrum pin 130 is shown engaged for the actuation of the chain lifter lever, it will be seen that the point 154 of the finger 151 will engage the lug 153 of the yoke lever 140 and cause it to be moved clockwise, as viewed in Fig. 19, until the stop 163 is reached. During such movement, the fulcrum pin will be withdrawn to the dotted-line position of Fig. 20 and the chain lifter lever will be freed from engagement with the lifter lever arm, which arm will be moved idly upon the pivot bolt 131 through the next two impulses given to it by the lifter cam 134. As the finger travels along in its movement, due to the rotation of the bracket 152, the head 155 of the finger, which is very much wider than the body of the finger, will come in contact with the lug 153 of the yoke and cause the finger to be moved about its pivot pin 157 to the opposite position and against the stop 156. In this position, it will be positioned for further engagement with the lug 153 of the yoke lever when it has been rotated to the point of engagement or after two impulses of the lifter lever arm 132.

This machine also comprises a turning spindle 164 (see Figs. 16 and 22), which is mounted for reciprocation and rotation in a manner similar to that employed on chain forming machines. It is usual practice, however, to have these spindles rotate first in one direction and then in the other, whereas in the apparatus for carrying out my method, as shown in the drawings, it is necessary that this spindle be operated so as to rotate each link after formation on its minor axis 40 in the same direction. The spindle is operated by means of the usual spindle rack 165 which is actuated by means of the turning rack cam 166, the face of which being so formed as to produce uni-directional movement, instead of reverse movement which is now common in machines of this type. The mechanism for actuating the turning spindle axially is also common and well known in this type of machine and does not form a part of my invention and, therefore, is not further described.

The turning spindle is provided with turning fingers 170 and 171. These fingers, as is well known, are connected together by means of a spring 172 and are designed to engage with the newly formed link when in its horizontal position and to rotate it to its vertical position on its minor axis 40, as shown clearly in Figs. 22 to 24, inclusive. The upper turning finger 170 is of the usual design, whereas the lower turning finger 171 has a curved, offset portion 173 which provides the necessary clearance for the finished chain, as clearly shown in the last mentioned figures.

When the blanks are fed underneath the second, next preceding links, as shown in Figs. 9 and 11, it is quite essential that the first, next preceding links into which the blank has just been fed be turned upon its perpendicular axis 43 in order that the joints of these last mentioned links may be properly positioned. To accomplish this, I have provided a mandrel plunger 174 which is mounted within a groove 175 formed longitudinally in the face of the mandrel and in the surface which bears against the retaining plate 87. This plunger is provided with a head 176 which, in the position shown in Figs. 22 and 23, engages the lower edge of the finger 171 of the turning spindle and is held there by the tension of a helical spring 180. This spring is mounted upon a rod 181 which is slidably mounted in a cross-piece 182 secured to the mandrel. The rod 181 has a head 183 at its lower end which bears against the cross-piece 182 which, when the plunger is allowed to move upwardly, acts as a stop to limit its upward movement. From the position shown in Fig. 22, the plunger is elevated by tension of the spring 180 when the turning fingers are withdrawn, thus engaging the bottom of the link shown in this figure and causing it to be moved upwardly, thus permitting the link just released by the turning fingers 170 and 171 to turn about its perpendicular axis and to fall, by gravity, on the outside of the link just formed.

When forming chain links according to my method, the chain is given a 90° turn axially each time a link is formed, which causes the links to be in twisted relation with each other. It is necessary, therefore, in order to prevent such twisted relation of the links, to provide some means to compensate for the 90° turn given to the chain each time a link is formed. Such means may comprise a container 184 for receiving the finished chain, which container is rotated at the correct speed.

Figure 17:
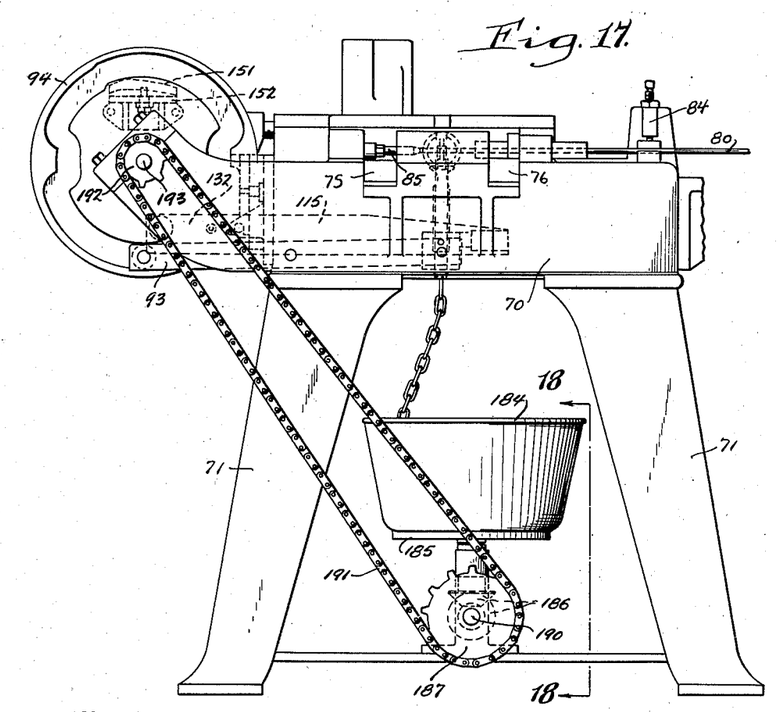
Fig. 17 is a fragmentary, front elevation of the same.
Figure 18:
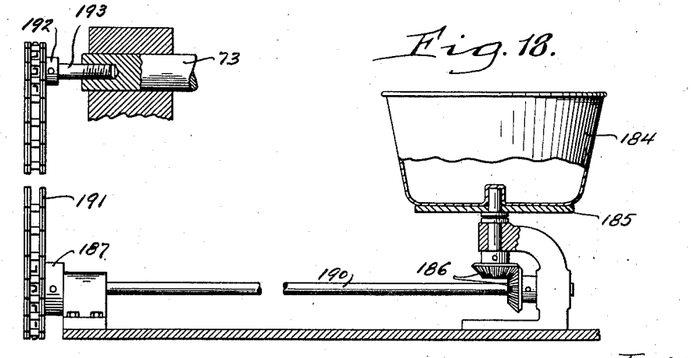
Fig. 18 is a fragmentary, side elevation, as viewed from the right-hand side of Fig. 17, of a portion of the machine for preventing the chain, as a whole, from becoming twisted during its formation.
Figure 19:
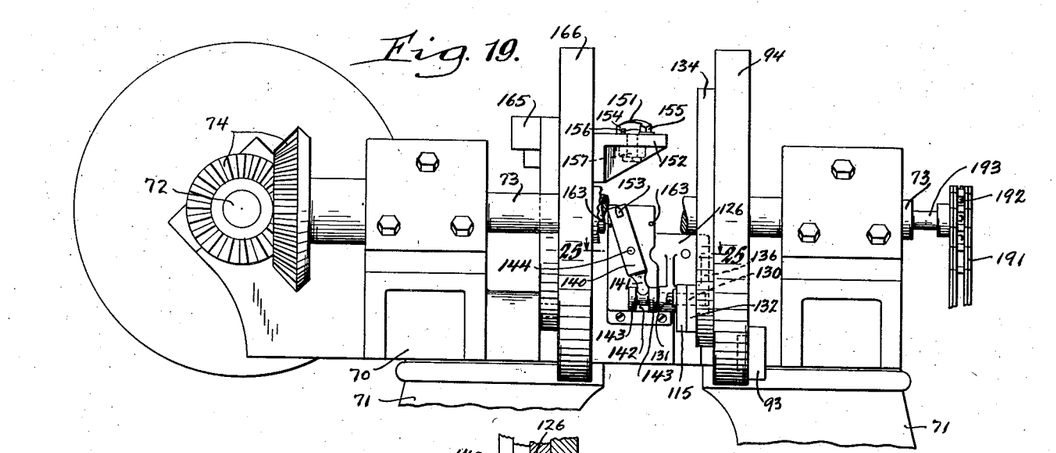
Fig. 19 is an enlarged, fragmentary, end elevation of the machine as it appears from the left-hand side of Fig. 16, opposite that shown in Fig. 17.

Referring to Figs. 17 and 18, 184 is such a receiving container which is mounted upon a turn table 185. The turn table is driven through a pair of bevel gears 186 to one of which a shaft 190 is attached. The shaft 190 is driven by means of a chain 191 which engages a sprocket 187 carried by the said shaft and another sprocket 192 carried by a stud 193 is secured in the end of the auxiliary shaft 73.

It is obvious that the turn table 185, together with its container, is rotated in such direction as to counteract the rotation of the chain during the formation of the links thereof.

It is obvious that after the chain links have been formed and assembled upon the chain forming machine just above described, it is passed through a standard welding machine and the joints of each of the links are electrically welded in well known manner. Since this welding does not form a part of my invention, and since welders are standard, such apparatus is not shown or described in this application, it being understood that the welding is accomplished in well known manner common to the welding of chain links of various types.

Figure 14:
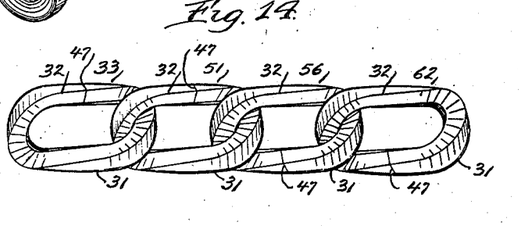
Fig. 14 shows a top plan view of a piece of chain welded and twisted and in complete form, ready to be severed in proper lengths for use as cross-chains for anti-skid devices.
Figure 15:
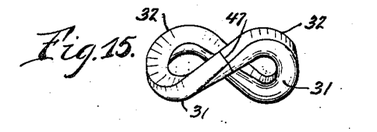
Fig. 15 is a side elevation of a single link of a chain made in accordance with my method, showing the twist thereof.
Figure 27:
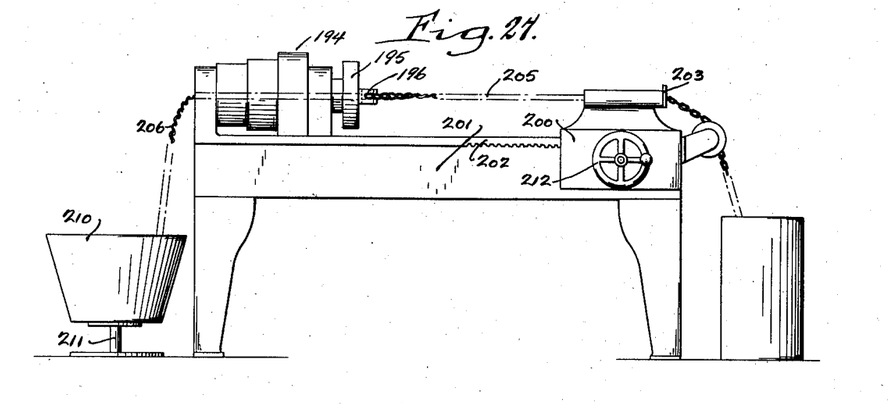
Fig. 27 is a side elevation of a form of apparatus for carrying out the twisting step of my method.
Figure 28:
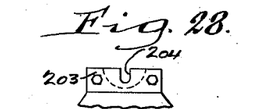
Fig. 28 is a fragmentary, end elevation of part of the apparatus shown in Fig. 27.

As hereinbefore pointed out and as shown in Figs. 14 and 15, the chain, after having been formed by the bending and assembling of the links, is twisted. This twisting operation is done by any suitable means but preferably by means of a twisting lathe like that shown in Figs. 27 and 28. In general, this is a standard type of machine comprising a headstock 194 having a suitably driven spindle, carrying a face plate 195 to which a chain holder 196 is attached. A carriage 200 is slidably mounted upon the bed 201 of the lathe, which bed is provided with a gear rack 202. The tail stock is provided with a chain fixture 203 in which that portion of the chain at the end of the twist is held. Fig. 28 shows an end view of the chain fixture attached to the slide of the lathe and this is similar in form to the chain holder 196. This fixture has a slot 204 which is wide enough to engage the sides of any selected link and is narrow enough to prevent the next adjacent link from passing therebetween. Obviously, the chain is twisted in any desired continuous lengths depending somewhat upon the length of the twisting lathe, one of such lengths being shown at 205. The twisted portion 206 of the chain passes through the customary opening in the spindle of the head stock and is deposited in a receiving container 210. This container is rotatably mounted upon a pedestal 211 so that it may be rotated by hand when the chain is drawn through the head stock, which counteracts the twisting action given to it in the step of twisting. As shown in Fig. 27, one end of the length 205 is gripped by the clamp 196 and the other end is gripped by the fixture 203. The hand wheel 212, which is connected through a suitable pinion (not shown) to the rack 202 provides means for moving the carriage backwardly away from the head stock and for maintaining the length of chain 205 in taut manner. The lathe head stock spindle is now operated in the same direction as the direction of the helix formed by the traction faces of successive links, as hereinbefore clearly pointed out, and the length of the chain 205 is twisted from end to end. The twisting continues until each link has been twisted substantially through an angle of 90° or brought to the position shown by the links in Figs. 14 and 15. The twisting is carried a slight distance beyond this point so as to allow the links to be perfectly flexible, whereupon the head stock spindle is stopped and the ends of the twisted portion 205 disengaged from the fixture 203 and from the clamp 196 and the twisted portion is drawn through the head stock, after which another length of the running, untwisted chain is connected to the clamp and fixture and the twisting operation again carried on. Obviously, when twisting the initial length of chain, the first link at the head stock end is used as a stop and the twisting begins with the second link, or a short piece of link blank stock may be slipped through the first link to engage the clamp 196 and act as a stop, thus permitting the first link to be twisted, as link 33 in Fig. 14. After the first length of chain is twisted, the last twisted link in each section is engaged with said clamp before twisting the next section.

As will be clear from the foregoing description, when a chain is to be formed, in accordance with my invention and by means of the apparatus shown in the accompanying drawings, stock is fed in the usual manner to the chain forming machine and is severed, as is customary, in required lengths. The mandrel 86 is moved up into place as the blank is fed to position and the clamping finger 92 is then operated to hold the blank against the mandrel while the forming arms 77 of the machine are operated to bend the free ends of the blank about the mandrel and to produce a link like that shown in Fig. 2. The turning spindle is then operated and the turning fingers 170 and 171, which normally lie in a horizontal plane, are moved outwardly and grasp the link just formed, turning it upon its minor axis 40 through an angle of substantially 90° in clockwise direction, or to the position shown by the link 33 in Fig. 5. While this link is held in this position, another blank is fed to the machine through this link and a second link is formed in a manner similar to the first one and as hereinbefore pointed out at length in connection with the description of my method. As just stated, it is clear from the description hereinbefore set forth, that the links are individually formed in alternate groups of two in relation to the feeding of the link blank and the links previously formed. Two links are formed from blanks which are fed above two second, next preceding links and then, alternately, the next two successive links are formed from blanks which are fed underneath the two second, next preceding links. This underneath feeding is accomplished by the operation of the lifting device. As hereinbefore clearly set forth, this chain lifter is operated for two impulses of the lifter lever arm 132, and then remains inactive for the next two impulses. After the chain is formed, as hereinbefore clearly set forth, it is welded and twisted according to my method.

Having thus described my invention, what I claim is:

1. A method of making twisted chain formed of links, each link having a traction surface and an opposite tire-engaging surface, assembling each successive link and arranging its traction surface at substantially right angles to the traction surface of the next preceding link, and then twisting the chain, whereby the traction surfaces of the links will be positioned on one side of the chain.

2. A method of making twisted chain formed of links, each link having a traction surface and an opposite tire-engaging surface, assembling each successive link and arranging its traction surface at substantially right angles to the traction surface of the next preceding link and in helical arrangement therewith, then welding the joints of the links, and then twisting the chain in the same direction as the helical arrangement of the links thereof, whereby all traction surfaces of the links will be positioned on one side of the chain.

3. A method of making twisted cross chain formed of links, each link having a traction surface and an opposite tire-engaging surface, assembling each successive link and arranging its traction surface at substantially right angles to the traction surface of the next preceding link and in helical arrangement therewith, said helical arrangement being clockwise with respect to the face of the next preceding link, then welding the joints of the links, and then twisting the welded links in clockwise direction.

4. A method of making twisted cross chain formed of links, each link being formed from wire having a cross section so shaped as to provide oppositely arranged traction and tire-engaging surfaces of different contours, successively feeding link blanks to a link forming machine, forming each blank into a link in said machine after it is assembled with the next previously formed link, turning each successive link on its minor axis in one and the same direction through an angle of substantially 90° before the blank of the next successive link is fed therethrough whereby successive links will have their traction faces helically arranged with respect to each other, then welding the joints of the links, and then twisting the welded links on their major axes in the same direction as the direction of turning of the links on their minor axes, when being formed, an amount which will cause each link to be twisted to an angle of substantially 90°.

5. A method of making twisted cross chain formed of links, each link being formed from wire having a cross section so shaped as to provide oppositely arranged traction and tire-engaging surfaces of different contours, successively feeding link blanks to a link forming machine, forming each blank into a link in said machine after it is assembled with the next previously formed link, turning each successive link on its minor axis in one and the same direction through an angle of substantially 90° before the blank of the next successive link is fed therethrough, and feeding the blank of each successive link into the first, preceding link alternately above and below the second preceding links.

6. A method of making twisted cross chain formed of links, each link being formed from wire having a cross section so shaped as to provide oppositely arranged traction and tire-engaging surfaces of different contours, successively feeding link blanks to a link forming machine, forming each blank into a link in said machine after it is assembled with the next previously formed link, turning each successive link on its minor axis in the same direction through an angle of substantially 90° before the blank of the next successive link is fed therethrough, and successively feeding blanks for two succeeding links into the first preceding links and alternately above and below the second preceding links.

7. A method of making twisted cross chain formed of links, each link being formed from wire having a cross section so shaped as to provide oppositely arranged traction and tire-engaging surfaces of different contours, successively feeding link blanks to a link forming machine, forming each blank into a link in said machine after it is assembled with the next previously formed link, turning the first link on its minor axis through an angle of substantially 90°, feeding the blank for the second link through the first link, turning the second link on its minor axis through an angle of substantially 90°, feeding the blank for the third link into the second link and above the first link, turning the third link on its minor axis through an angle of substantially 90°, elevating the first and second links so that the end of the second link which engages the third link will be at the top of the third link, feeding the blank for the fourth link through the third link and underneath the second link, lowering the three successive links, turning the fourth link on its minor axis through an angle of substantially 90°, elevating the first three links so as to bring the end of the third link which engages the fourth link at the upper end of the fourth link, then feeding the blank for the fifth link through the fourth link and underneath the third link, lowering the four successive links, turning the fifth link on its minor axis through substantially 90°, and then feeding the blank for the sixth link through the fifth link and above the fourth link.

8. A method of making twisted cross chain formed of links, each link being formed from wire having a cross section so shaped as to provide oppositely arranged traction and tire-engaging surfaces of different contours, successively feeding link blanks to a link forming machine, forming the blanks into links in said machine, turning the first link on its minor axis through an angle of substantially 90°, feeding the blank for the second link through the first link, turning the second link on its minor axis through an angle of substantially 90° and simultaneously turning the first link on its major axis through an angle of substantially 90°, feeding the blank for the third link into the second link and above the first link, turning the third link on its minor axis through an angle of substantially 90° and simultaneously turning the first and second links on their major axes through an angle of substantially 90°, elevating the first and second links so that the end of the second link which engages the third link will be at the top of the third link, feeding the blank for the fourth link through the third link and underneath the second link, lowering the first and second links and turning the third link on its perpendicular axis through an angle of substantially 180°, turning the fourth link on its minor axis through an angle of substantially 90°, and simultaneously turning the first, second and third links on their major axes through an angle of substantially 90°, elevating the first three links so as to bring the end of the third link which engages the fourth link at the upper end of the fourth link, then feeding the blank for the fifth link through the fourth link and underneath the third link, lowering the three links and simultaneously turning the fourth link on its perpendicular axis through an angle of substantially 180°, turning the fifth link on its minor axis through substantially 90° and simultaneously turning the first, second, third and fourth links on their minor axes, and then feeding the blank for the sixth link through the fifth link and above the fourth link.

9. A method of making twisted cross chain formed of links, each link being formed from wire having a cross section so shaped as to provide oppositely arranged traction and tire-engaging surfaces of different contours, successively feeding link blanks to a link forming machine, forming each blank into a link in said machine after it is assembled with the next previously formed link, turning each successive link on its minor axis in one and the same direction before the blank of the next successive link is fed therethrough, feeding the blank of each successive link into the next first preceding links alternately above and below the second preceding links, then welding the joints of the links, and then twisting the welded links on their major axes in the same direction as the direction of turning of the links on their minor axes when being formed.

10. A method of making twisted cross chain formed of links, each link being formed from wire having a cross section so shaped as to provide oppositely arranged traction and tire-engaging surfaces of different contours, successively feeding link blanks to a link forming machine, forming each blank into a link in said machine after it is assembled with the next previously formed link, turning each successive link on its minor axis in the same direction before the blank of the next succeeding link is fed therethrough, successively feeding the blanks for two succeeding links into the first preceding links alternately above and below the second preceding links, then welding the joints of the links, and then twisting the welded links on their major axes in the same direction as the direction of turning of the links on their minor axes when being formed.

11. A method of making twisted cross chain formed of links, each link being formed from wire having a cross section so shaped as to provide oppositely arranged traction and tire-engaging surfaces of different contours, successively feeding link blanks to a link forming machine, forming each blank into a link in said machine after it is assembled with the next previously formed link, turning the first link on its minor axis, feeding the blank for the second link through the first link, turning the second link on its minor axis, feeding the blank for the third link into the second link and above the first link, turning the third link on its minor axis, elevating the first and second links so that the end of the second link which engages the third link will be at the top of the third link, feeding the blank for the fourth link through the third link and underneath the second link, lowering the first and second links and turning the third link on its perpendicular axis through an angle of substantially 180°, turning the fourth link on its minor axis, elevating the first three links so as to bring the end of the third link, which engages the fourth link at the upper end of the fourth link, then feeding the blank for the fifth link through the fourth link and underneath the third link, lowering the three links and turning the fourth link on its perpendicular axis through an angle of substantially 180°, turning the fifth link on its minor axis, and then feeding the blank for the sixth link through the fifth link and above the fourth link, then welding the joints of the links, and then twisting the welded links on their major axes in the same direction as the direction of turning of the links on their minor axes when being formed.

12. A method of making twisted cross chain formed of links, each link being formed from wire having a cross section so shaped as to provide oppositely arranged traction and tire-engaging surfaces of different contours, successively feeding link blanks to a link forming machine, forming each blank into a link in said machine after it is assembled with the next previously formed link, turning the first link on its minor axis, feeding the blank for the second link through the first link, turning the second link on its minor axis, feeding the blank for the third link into the second link and above the first link, turning the third link on its minor axis, elevating the first and second links so that the end of the second link which engages the third link will be at the top of the third link, feeding the blank for the fourth link through the third link and underneath the second link, lowering the first, second and third links, turning the fourth link on its minor axis, elevating the first three links so as to bring the end of the third link which engages the fourth link at the upper end of the fourth link, then feeding the blank for the fifth link through the fourth link and underneath the third link, lowering the four links, turning the fifth link on its minor axis, then feeding the blank for the sixth link through the fifth link and above the fourth link, then welding the joints of the links, and then twisting the welded links on their major axes in the same direction as the direction of turning of the links on their minor axes when being formed.

FRANK E. STAHL.